US005396690A

United States Patent [19]

Wells et al.

[11] Patent Number: 5,396,690

[45] Date of Patent: Mar. 14, 1995

[54] WASHING MACHINE AGITATOR SPLINE REMOVAL AND INSTALLATION METHOD

[76] Inventors: Richard C. Wells, 300 W. Buchanan Ave.; Ralph E. Bidwell, 6214 White Oak La., both of Orlando, Fla. 32809

[21] Appl. No.: 966,505

[22] Filed: Oct. 26, 1992

[51] Int. Cl.[6] ........................ B23P 19/02; B23P 19/04

[52] U.S. Cl. ................................ 29/402.08; 29/426.4; 29/426.5; 29/525; 29/263; 29/266

[58] Field of Search ............... 29/426.1, 426.5, 402.03, 29/402.08, 426.4, 266, 263, 283, 525

[56] References Cited

U.S. PATENT DOCUMENTS 1,728,248 9/1929 Naggy et al. ..................... 29/266 X
2,690,613 10/1954 Bishop .................................. 29/263
2,964,841 12/1960 Farris ................................ 29/266 X

*Primary Examiner*—Joseph M. Gorski

[57] ABSTRACT

A washing machine agitator spline coupling tool and method for using the tool is described for removing and installing an agitator spline coupling used to couple the agitator to the washing machine drive system. The tool facilitates in removing the spline coupling and installing a replacement spline coupling to an original factory installed position within the agitator. The useful life of the washing machine is extended without the need to replace the agitator itself. The tool includes a shaft and pressure plate assembly mechanism for pulling the spline coupling out of the agitator without damage to the agitator by maintaining alignment of component parts. The design dimensions for the tool elements permit a used spline coupling to be replaced with a new spline coupling to a desired factory selected position.

7 Claims, 3 Drawing Sheets

WASHING MACHINE AGITATOR SPLINE REMOVAL AND INSTALLATION METHOD

BACKGROUND OF THE INVENTION

1. Field of the Invention

The invention relates to a tool and method for removing and installing a spline coupling located in a washing machine agitator assembly.

2. Description of the Background Art

A typical service repair in the operating life of a washing machine includes the replacement of the washing machine agitator spline coupling. Replacing a worn or damaged spline coupling can eliminate the need to replace the entire agitator. Prior to the disclosed invention, a variety of methods were employed for the replacement of this spline coupling. These methods typically included the combination use of a variety of service tools in a service contractor's tool box. As in the removal of many concentrically fitted devices, a method of pulling the inner element needed to be employed.

Typical removal of an agitator spline coupling can often result in damage to the agitator and the need to replace the entire agitator assembly. Inserting of a replacement spline coupling was often a hit or miss effort with regard to locating the spline coupling to the exact location of the factory installed spline coupling. The replacement of the spline coupling to its precise location within the agitator will provide the continued performance of the washing machine to its design specifications.

The disclosed invention addresses the need for the proper removal and installation of the washing machine agitator spline coupling with its unique features and the method employed for its use.

SUMMARY OF INVENTION

The present invention contemplates a tool and method for removing and installing a spline coupling of a washing machine agitator assembly. The tool is used to facilitate in the removal of the spline coupling by incorporating the use of an elongated shaft having a threads on a distal end and a grip on a proximal end. The grip is dimensioned so as to fit the dimension of the spline coupling along the axis of the spline coupling when the shaft is placed into the bore of the spline coupling. The elongated shaft extends beyond the agitator when placed along the axis of the agitator. The shaft is placed through a pressure plate in a hole located in the center of the pressure plate. The pressure plate is forced against the agitator hub bearing at the bottom of the agitator. With the grip affixed to the spline coupling and the pressure plate affixed to the hub bearing, pressure is put onto the pressure plate to allow the shaft to pull the spline coupling from its location in the top of the agitator. The spline coupling is thus removed without damage to the agitator.

For the installation of the spline coupling, the pressure plate affixed to the top of the agitator. A replacement spline coupling is placed onto the shaft and against a stop located on the shaft. With the spline coupling on the shaft, the shaft is placed through the agitator axis from the bottom of the agitator through the hub bearing and through the top. With the shaft extended through the top, the pressure plate is placed onto the top. With the spline located between the stop on one side and the agitator top and pressure plate on the other side, pressure is placed on the pressure plate to pull the spline into a desired position within the agitator top.

The pressure plate includes a center sheave and an outside sheave. The center sheave is dimensioned to receive the spline coupling during the installation process and stop the spline coupling at the exact location as a factory installed spline coupling. The outside sheave is dimensioned to fit around the hub bearing at the bottom of the agitator and is used to keep the shaft centered along the agitator axis during the removal of the spline coupling. Pressure is placed against the pressure plate by the use of a puller nut dimensioned to fit onto the threads of the shaft distal end. By imposing a torque onto the puller nut, increasing pressure is placed onto the pressure plate. This increasing pressure overcomes the friction holding the spline coupling into the agitator top and it is removed. During installation of the spline coupling, torque is placed on the puller nut to overcome friction and force the spline coupling into the top of the agitator.

The puller nut has a handle affixed in one embodiment. In a second embodiment, the handle has a crank knob. The grip is used as a means for applying additional torque and is included in the preferred embodiment of the invention. A dowel is used as the stop in the preferred embodiment by inserting the dowel into the shaft having a hole perpendicular to the axis of the shaft.

BRIEF DESCRIPTION OF DRAWINGS

A preferred embodiment of the invention as well as secondary embodiments are described by way of example with reference to the accompanying drawings in which.

DETAILED DESCRIPTION OF PREFERRED EMBODIMENT

The preferred embodiment of the invention, a washing machine agitator spline removal and installation tool 10, is disclosed.

Figure 1:
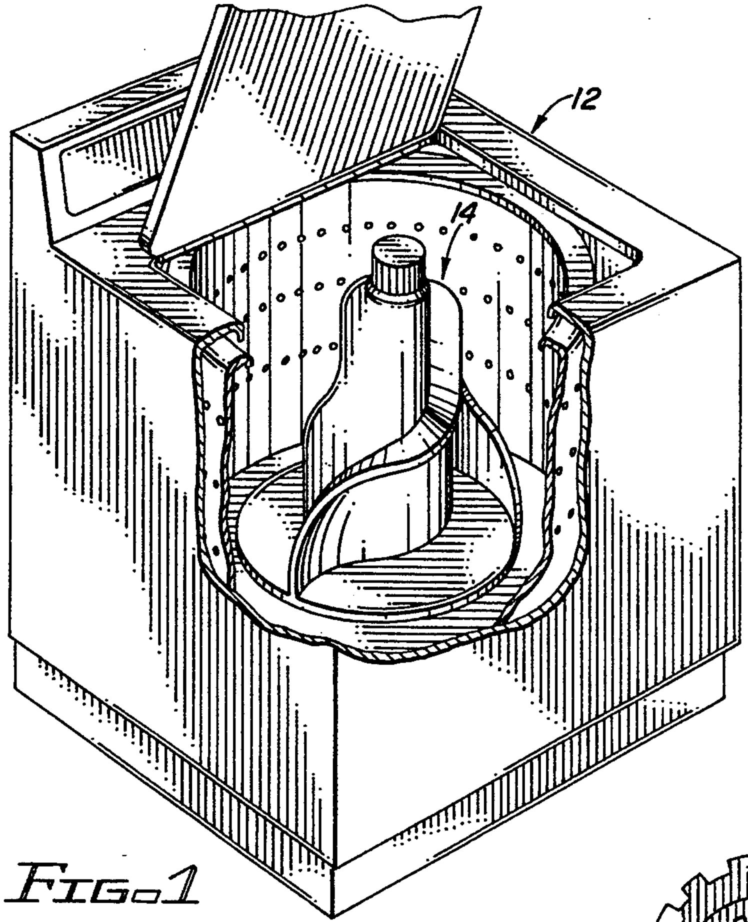
FIG. 1 is a cutaway view of a washing machine disclosing the washing machine agitator housing assembly.
Figure 2B:
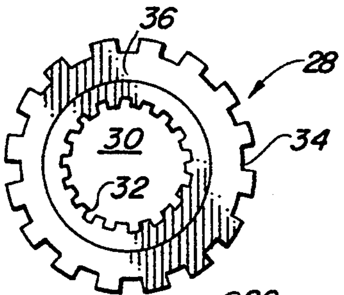
FIG. 2 is a partial cross-section side view of the agitator top disclosing the agitator spline coupling and the washing machine transmission agitator shaft in a position as it would appear from an original factory installation along with a top view of the spline coupling.
Figure 2A:
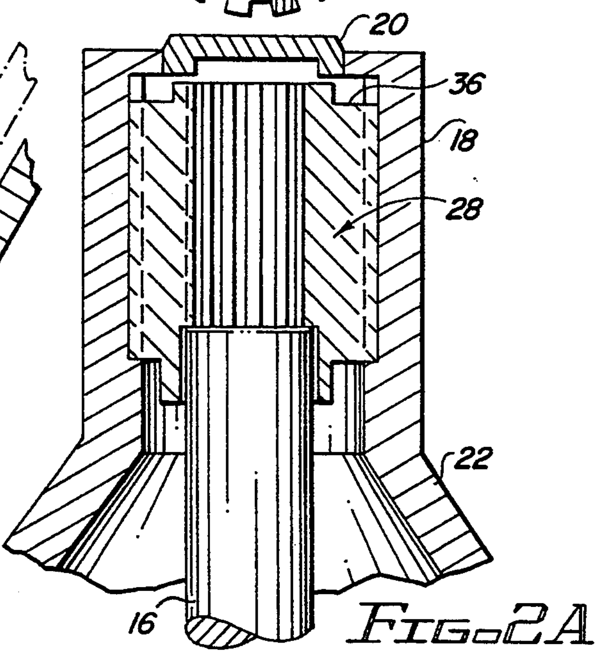

A washing machine 12 contains an agitator 14 (refer to FIG. 1) that is driven by a washing machine transmission agitator shaft 16 (refer to FIG. 2). The transmission agitator shaft 16 is coupled to the agitator 14 by the use of a spline coupling 28. The spline coupling 28 is fitted within the agitator 14 at a top 20 of the agitator 14 (refer to FIG. 2). The factory installed spline coupling 28 is inserted from a bottom end 26 of the agitator housing 22 which is a molded form having no other opening other than at the bottom end 26 through an agitator hub bearing 24. In order to replace the spline coupling 28, it is necessary to access the spline coupling from the top end 18 of the agitator 14. As a first step in the process of removing the spline coupling 28, it is necessary to cut an opening and remove the agitator cap 20. The opening should be large enough to expose the spline coupling top face 36 but not expose the spline coupling outside coupling teeth 34. A typical method of removing the agitator cap 20 includes the use of standard hole cutting drill bits.

The tool 10 includes a shaft 38 having a distal end 40 and a proximal end 42. The distal end 40 is threaded to receive a puller nut 68. The diameter of the shaft 38 is such that it closely fits within the spline coupling center bore 30. A grip 52 is affixed to the proximal end 42 of the shaft 38. The grip 52 has a cylindrical shape with a diameter closely sized to the spline coupling 28 outside diameter. The grip 52 includes a dowel storage hole 54. A dowel 50 is placed within the dowel storage hole 54 during the process of removing the spline coupling 28. The grip 52 has a top end 56 and a shaft end 58.

Figure 3:
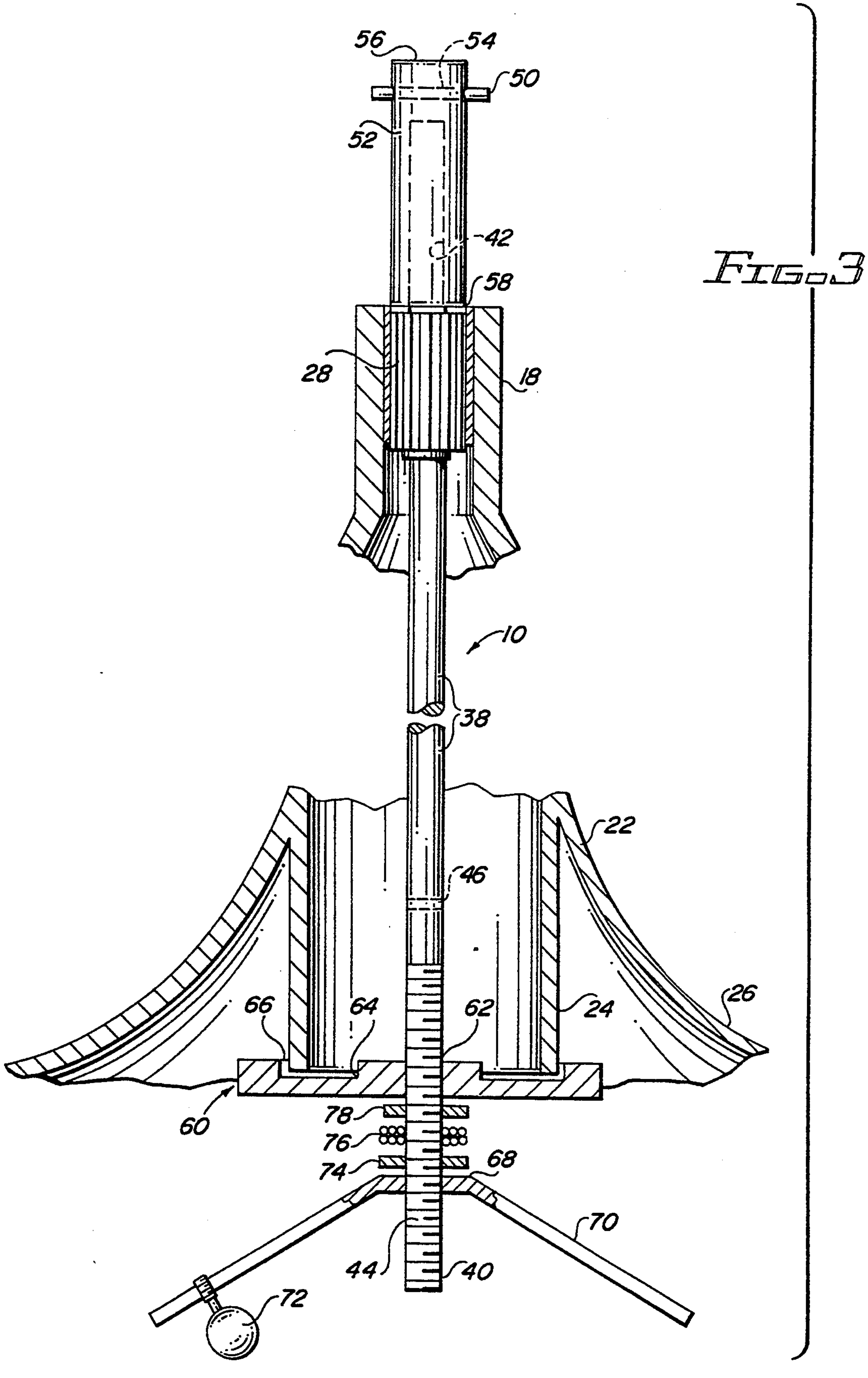
FIG. 3 is a partial cross-section side view of the agitator housing disclosing the invention including a pressure plate, shaft and grip in place for the removal of the spline coupling.

The distal end 40 of the shaft 38 is passed through the spline coupling center bore 30 from the agitator top end 18 and through the agitator housing 22 until the grip shaft end 58 is biased against the spline coupling top face 36. In this position, the shaft 38 will extend beyond the agitator bottom end 26 and protrude from the agitator hub bearing 24. A pressure plate 60 is placed onto the shaft 38 by passing the shaft 38 through the pressure plate having a center hole 62. The pressure plate 60 has an outside sheave 66 and a center sheave 64. The outside sheave 66 is placed over the agitator hub bearing 24. In this position, the shaft 38 is aligned along the axis of the agitator 14. A pressure plate washer 78, a thrust bearing 76, and then a puller nut washer 74 are consecutively placed onto the shaft 38. A puller nut 68 is then affixed to the shaft 38 by rotating the puller nut 68 and advancing it onto the threaded distal end 40 of the shaft 38. A handle 70 is affixed to the puller nut 68 for ease in applying torque to the puller nut 68 as it is biased against the pressure plate 60. Although not a requirement, the preferred embodiment includes the thrust bearing 76 reduces friction and permits the puller nut 68 to rotate smoothly. In addition, a crank knob 72 can be added for further ease in rotating the handle 70. FIG. 3 discloses this preferred embodiment used in removing the spline coupling 28 from its position in the top end 18 of the washing machine agitator 14. The puller nut 68 is continuously advanced and biased against the pressure plate 60 until the spline coupling 28 has been pulled from its position in the top end 28 of the agitator 14.

Figure 4:
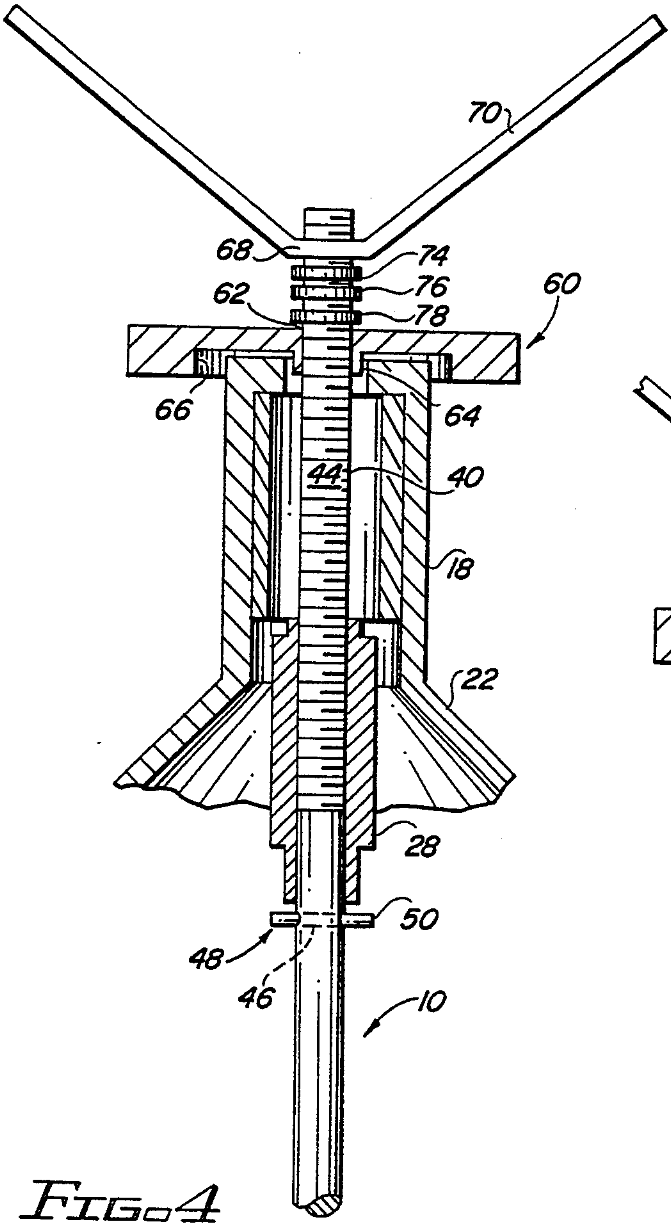
FIG. 4 is a partial cross-section side view of the agitator top and a portion of the invention being used during installation of the spline coupling shown with the spline coupling in position ready to be pulled into its desired position.
Figure 5:
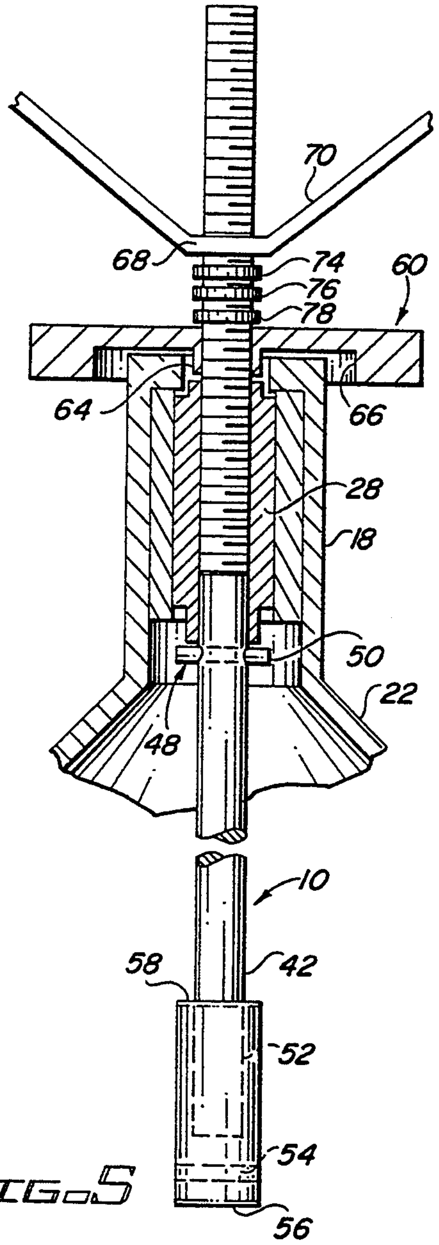
FIG. 5 is similar to the partial cross-section side view of FIG. 4 with the exception that the spline coupling has been pulled into its desired position within the top of the agitator as a result of the installation process.

The use of the tool 10 for installing the spline coupling 28 is disclosed in FIG. 4 and FIG. 5. During the installation of the spline coupling 28, the shaft distal end 40 includes the use of a stop 48 which is made by inserting the dowel 50 into the shaft 38 having a shaft dowel hole 46. The dowel 50 extends beyond the walls of the shaft 38 and is perpendicular to the axis of the shaft 38 near the distal end 40. The distal end 40 of the shaft 38 is passed through the center bore 30 of the spline coupling 28 so as to permit the spline coupling 28 to be biased against the stop 48. The shaft distal end is passed through the agitator hub bearing 24 and extended through the top end 18. Once through the top end 18, the pressure plate 60, the pressure plate washer 78, the thrust bearing 76, and the puller nut washer 74 are placed onto the shaft 38. The pressure plate center sheave 64 is placed into the top end 18. The puller nut 68 is advanced and biased against the pressure plate 60 as described in the spline coupling 28 removal process. The preferred embodiment includes the handle 70 affixed to the puller nut 68. The handle 70 can include the crank knob 72 as also described earlier. The puller nut 68 is advanced and biased against the pressure plate 60 and thus pulling the shaft 38 through the agitator top end 18. The spline coupling 28 biased against the stop 48 is pulled into the top end 18 and continues until the spline coupling 28 is biased against the pressure plate center sheave 64. The depth of the center sheave 64 is dimensioned to stop the advance of the spline coupling 28 at a position desired and as the original factory installed spline coupling 28. FIG. 5 shows the preferred embodiment of the tool 10 and the spline coupling 28 in its desired position for washing machine 12 operation.

Figure 6:
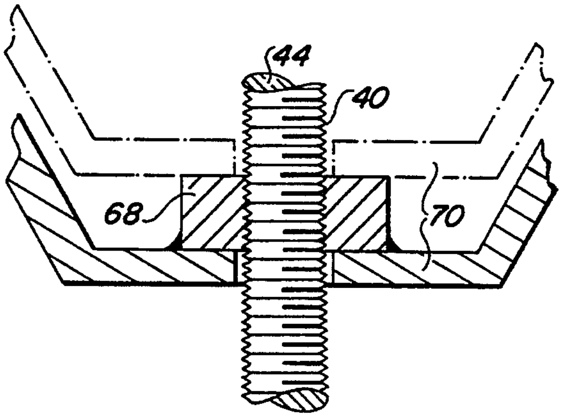
FIG. 6 is a partial cross-sectional view of one embodiment of a puller nut and a second embodiment of the handle indicated with dotted lines.

The handle 70 can be affixed to the top or bottom of the puller nut 68. FIG. 6 shows possible handle 70 and puller nut 68 combinations. It is anticipated that other embodiments are possible and can be made and used by one skilled with mechanical tools.

Figure 7B:
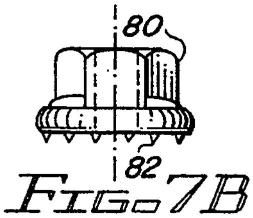
FIG. 7 is a partial cross-sectional view of a flanged nut having a serrated face used to replace the grip in another possible embodiment.
Figure 7A:
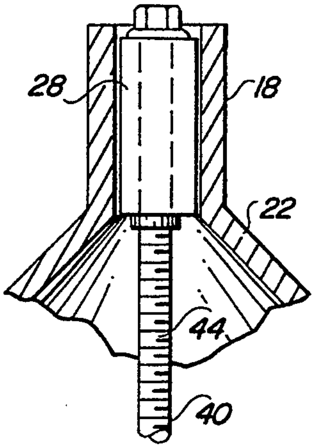

The grip 52 described is the preferred embodiment however a second embodiment includes a flanged nut 80 having a serrated face 82. This configuration is shown in FIG. 7.

The preferred embodiment described has been shown with various modifications to various elements of the tool 10. It is anticipated that one skilled in servicing washing machines 12 and in particular replacing agitator spline couplings 28, can devise other embodiments and combinations of the elements disclosed.

What is claimed is:

1. A method for installing a spline coupling into a top of a washing machine agitator, comprising the steps of:
   - providing a shaft having a distal end and a proximal end, the distal end having threads, the proximal end having a dowel hole for receiving a dowel;
   - providing a dowel;
   - inserting the dowel into the dowel hole, the hole penetrating radially through the shaft;
   - placing the shaft through an axial bore of the spline coupling until the spline coupling rests against the dowel;
   - placing the distal end through the top of the agitator by entering the distal end through a hub bearing at an agitator bottom end and exiting the distal end through a top of the agitator;
   - providing a pressure plate having a center hole for receiving the shaft, the pressure plate having a center sheave dimensioned for positioning the spline coupling at a predetermined position within the agitator top;
   - inserting the shaft distal end through the pressure plate;
   - positioning the pressure plate against the top of the agitator with the center sheave fitting within a circular hole in the top;
   - providing a handle;

providing a puller nut;
affixing the handle to the puller nut;
rotatably affixing the puller nut onto the portion of threaded shaft;
turning the handle affixed to the puller nut thereby advancing the puller nut along the shaft and biasing it against the pressure plate;
applying a torque to the puller nut thereby further advancing the puller nut along the shaft and moving the dowel and spline coupling toward the top of the agitator; and
continuing to apply the torque to the puller nut until the spline coupling is biased against the center sheave of the pressure plate at a position within the agitator.

2. A method recited in claim 1 further comprising the steps of:
providing a washer and thrust bearing;
placing the washer and the thrust bearing between the pressure plate and the puller nut for reducing friction between the nut and the plate;
providing a crank knob;
affixing the crank knob to the handle; and
applying torque to the puller nut by turning the crank knob.

3. A method recited in claim 1 further comprising the step of holding the proximal end of the shaft while turning the handle and applying torque to the puller nut.

4. A method for replacing a spline coupling of a washing machine agitator, comprising the steps of:
providing an agitator having a spline coupling located within a top end of the agitator;
removing an agitator cap from a top of the agitator, thereby forming a hole and exposing an end face of the spline coupling;
providing a shaft having a distal end and a proximal end, the proximal end having threads, the distal end having a dowel hole penetrating radially through the shaft; the hole dimensioned to receive a dowel;
affixing a grip to the proximal end, the grip dimensioned for passing through the hole in the top of the agitator and for contacting the spline end face;
inserting the shaft distal end through the spline coupling affixed within the top of the agitator and continuing to insert the shaft until the distal end extends beyond a hub bearing at a bottom of the agitator;
providing a pressure plate having a center hole for receiving the shaft, the pressure plate having an outside sheave for receiving the agitator hub bearing and a center sheave dimensioned for positioning a replacement spline coupling at a predetermined position within the agitator;
inserting the shaft distal end through the pressure plate;
positioning the pressure plate against the agitator hub bearing with the hub bearing resting within the outside sheave of the pressure plate;
providing a handle;
providing a puller nut;
affixing the handle to the puller nut;
rotatably affixing the puller nut onto the threaded shaft;
turning the handle thereby advancing the puller nut along the shaft and biasing it against the pressure plate;
applying a torque to the puller nut, thereby further advancing the puller nut along the shaft and forcing the grip against the end face of the agitator spline coupling, and continuing to apply torque to the puller nut thereby causing the grip to force the spline coupling from its position within the top of the washing machine agitator;
removing the handle and puller nut from the shaft;
removing the pressure plate from the agitator hub bearing;
removing the shaft from the agitator;
providing a dowel;
inserting the dowel into the dowel hole;
providing a replacement spline coupling;
placing the shaft through an axial bore of the replacement spline coupling until the spline coupling rests against the dowel;
placing the distal end through the top of the agitator by entering the distal end through the agitator hub bearing and exiting the distal end through the top of the agitator;
inserting the shaft distal end through the pressure plate;
positioning the pressure plate against the top of the agitator with the center sheave fitting within the hole in the top;
rotatably affixing the puller nut onto the threaded portion of the shaft;
turning the handle, thereby advancing the puller nut along the shaft and biasing it against the pressure plate;
applying a torque to the puller nut, thereby further advancing the puller nut along the shaft and moving the dowel and the replacement spline coupling toward the top of the agitator; and
continuing to apply torque to the puller nut until the replacement spline coupling is biased against the center sheave of the pressure plate at a predetermined position within the agitator, the predetermined position corresponding to an original factory installed position for the spline coupling.

5. A method recited in claim 4 further comprising the steps of:
providing a washer and a thrust bearing;
placing the washer and the thrust bearing between the pressure plate and the puller nut;
providing a crank knob;
affixing the crank knob to the handle; and
applying torque to the puller nut by turning the crank knob.

6. A method recited in claim 4 further comprising the step of holding the grip while turning the handle and applying torque to the puller nut.

7. The method as recited in claim 4 further comprising the steps of forming the grip as a flanged nut having a serrated face, wherein said step of forcing the grip against the end face of the agitator spline includes penetrating said serrated face into the end face.

* * * * *